(12) United States Patent
Sulzbach et al.

(10) Patent No.: US 7,101,163 B2
(45) Date of Patent: Sep. 5, 2006

(54) PROCESS AND APPARATUS FOR THE CONTINUOUS PRODUCTION OF SLABSTOCK FOAM

(75) Inventors: Hans-Michael Sulzbach, Königswinter (DE); Lothar Röhrig, Neunkirchen-Seelscheid (DE); Reiner Raffel, Siegburg (DE)

(73) Assignee: Hennecke GmbH, Leverkusen (DE)

( * ) Notice: Subject to any disclaimer, the term of this patent is extended or adjusted under 35 U.S.C. 154(b) by 0 days.

(21) Appl. No.: 10/978,939

(22) Filed: Nov. 1, 2004

(65) Prior Publication Data

US 2005/0067728 A1    Mar. 31, 2005

Related U.S. Application Data

(62) Division of application No. 10/012,620, filed on Nov. 5, 2001, now Pat. No. 6,833,095.

(30) Foreign Application Priority Data

Nov. 8, 2000    (DE) ............................... 100 55 222

(51) Int. Cl.
B29C 44/20    (2006.01)

(52) U.S. Cl. .................... 425/4 C; 425/224; 425/817; 425/89; 264/51

(58) Field of Classification Search ............... 425/224, 425/4 R, 89, 817; 264/51
See application file for complete search history.

(56) References Cited

U.S. PATENT DOCUMENTS

| | | | | |
|---|---|---|---|---|
| 3,775,522 A | * | 11/1973 | Auge | 264/46.2 |
| 3,832,099 A | * | 8/1974 | Berg | 425/4 C |
| 4,032,275 A | | 6/1977 | Schwab et al. | 425/89 |
| 4,074,960 A | * | 2/1978 | Dockray et al. | 425/89 |
| 4,128,611 A | * | 12/1978 | Kolakowski et al. | 264/51 |
| 4,158,032 A | * | 6/1979 | Boon | 264/51 |
| 4,200,603 A | * | 4/1980 | Raffel et al. | 264/51 |
| 4,246,356 A | * | 1/1981 | Walmsley | 521/50 |
| 4,264,291 A | | 4/1981 | Hoffmann et al. | 425/224 |
| 4,363,610 A | * | 12/1982 | Murray et al. | 425/89 |
| 4,530,807 A | * | 7/1985 | Vreenegoor | 264/51 |
| 5,129,771 A | * | 7/1992 | Briles | 411/507 |
| 5,409,649 A | * | 4/1995 | Pool | 264/51 |
| 5,512,222 A | | 4/1996 | Sabol et al. | 264/51 |
| 5,527,172 A | * | 6/1996 | Graham, Jr. | 425/89 |
| 5,665,286 A | * | 9/1997 | Sulzbach et al. | 264/46.2 |
| 6,019,919 A | * | 2/2000 | Sulzbach et al. | 264/50 |
| 6,036,898 A | * | 3/2000 | Sulzbach et al. | 264/51 |
| 6,544,481 B1 | * | 4/2003 | Sulzbach et al. | 422/133 |
| 6,702,966 B1 | * | 3/2004 | Suzuki et al. | 264/70 |
| 6,734,220 B1 | * | 5/2004 | Niederoest et al. | 521/174 |
| 6,833,095 B1 | * | 12/2004 | Sulzbach et al. | 264/51 |
| 2003/0038392 A1 | * | 2/2003 | Weber et al. | 264/51 |
| 2003/0183971 A1 | * | 10/2003 | Griffiths | 264/51 |

FOREIGN PATENT DOCUMENTS

GB    1354341    5/1974

\* cited by examiner

*Primary Examiner*—Robert Davis
*Assistant Examiner*—G. Nagesh Rao
(74) *Attorney, Agent, or Firm*—Joseph C. Gil; N. Denise Brown

(57) ABSTRACT

Slabstock foam free of cavities can be produced without any restriction, i.e. also from rapidly reacting chemical systems, by introducing the liquid reaction mixture from underneath, in front of, and/or through an optionally swivellable floor plate, wherein the floor plate and the inlet for introducing the liquid reaction mixture is arranged in a manner such that the reaction mixture above the floor plate is substantially still liquid.

11 Claims, 3 Drawing Sheets

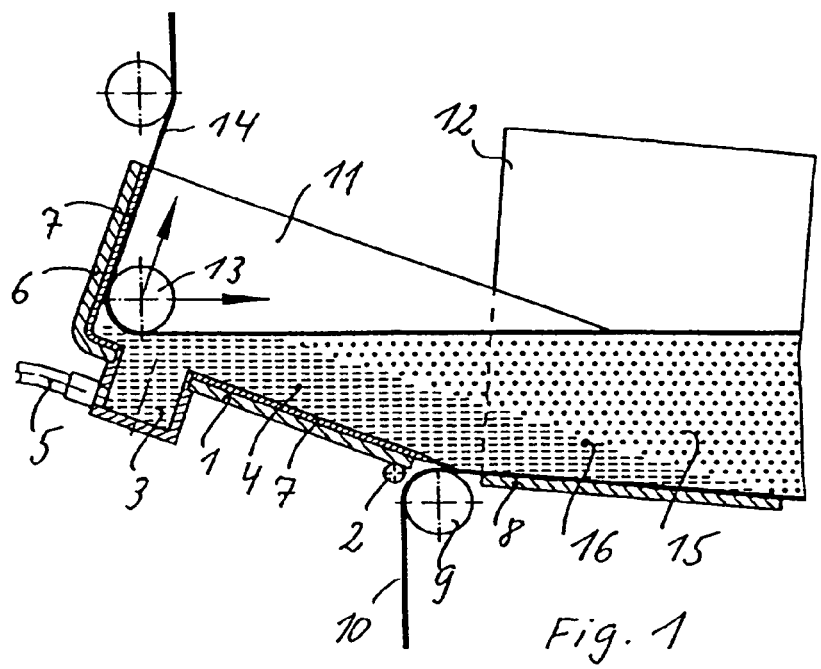
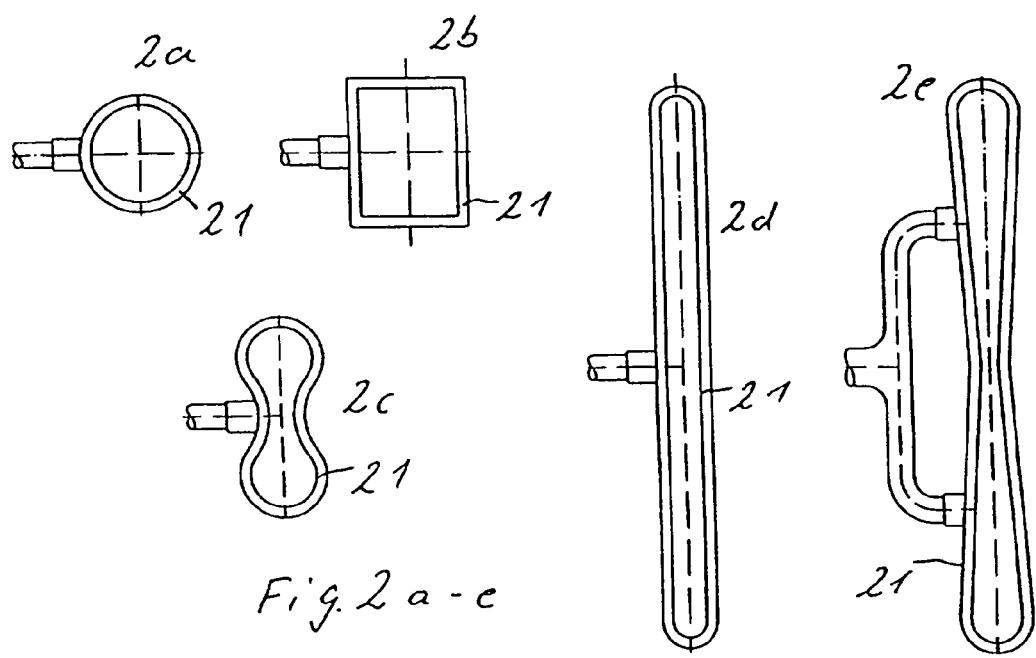
Fig. 1
Fig. 2 a–e

PROCESS AND APPARATUS FOR THE CONTINUOUS PRODUCTION OF SLABSTOCK FOAM

CROSS REFERENCE TO RELATED PATENT APPLICATIONS

The present divisional patent application claims priority under 35 U.S.C. 121 to U.S. patent application Ser. No. 10/012,620 filed Nov. 5, 2001, now U.S. Pat. No. 6,833,095.

BACKGROUND OF THE INVENTION

The present invention relates to a process and an apparatus for the continuous production of slabstock foam, in which a liquid reaction mixture is fed, divided transversely and allowed to cream and foam, following which the expanded slabstock foam is then removed.

It is known for example to produce a liquid reaction mixture of polyol and isocyanate for the continuous production of polyurethane slabstock foam by feeding the liquid reaction mixture into a relatively large distributing trough for a certain residence time, a run-off plate whose angle of inclination can be adjusted being arranged behind the trough. As a result of this residence in the distributing trough, the upper region of the reaction mixture creams, flows as it were in the "rising jet" onto and over the run-off plate and then foams to form a block (see DE-OS 2 142 450, believed to correspond to GB-PS 1 354 34). It has been found that this process and the associated apparatus are not suitable for processing rapidly reacting chemical systems since the mixture in the trough in this case quickly foams starting from the dead zones, i.e. the low-flow zones in the distributing trough. Complicated and expensive cleaning and paper lining procedures for the distributing trough are necessary before and after each foaming procedure.

According to another known process the liquid reaction mixture is usually applied from above to a trough-shaped paper film spread over a floor plate, the paper film being drawn, together with the applied and still liquid reaction mixture, underneath by an air gap. This air gap is formed by a guide roller underneath which runs a cover film (manufacturer's logo "51/1" "QFM" of Hennecke GmbH, D-53754 Sankt Augustin, No. D 9901-820 362 3T 10/98 Gö). Under the correct procedure the liquid reaction mixture forms a small bulge in front of this air gap, which prevents penetration of air between the reaction mixture and cover film. However, this does not prevent bubbles of air forming undesirable eddies in the reaction mixture when the latter is applied to the lower paper film. These bubbles are subsequently often the starting point for the formation of cavities.

There is thus a need to provide a process and apparatus by means of which slabstock foam can be produced without any restrictions a priori free of cavities, i.e. can be produced from rapidly reacting chemical systems.

SUMMARY OF THE INVENTION

This object is achieved if the reaction mixture discharges from underneath, in front of, and/or through a floor plate over which the reaction mixture is present substantially still in a liquid state, i.e. before the reaction mixture visibly foams. Normally three phases are distinguished during the reaction, namely the liquid phase, the creamy phase with a marked rise in viscosity on account of the (also visible) formation of foam, and the rising phase in which there is basically a build-up of the microfoam bubbles formed in the creamy phase. According to the invention the reaction mixture should have reached the floor plate before the onset of the creamy phase.

The time available from the discharge from the mixing device to the application to the floor plate is, according to the invention, about 1 to 10 seconds, preferably 1 to 5 seconds.

The new apparatus for the continuous production of slabstock foam from a liquid reaction mixture comprises a mixer together with an associated floor plate, a transporting system lined internally with films and provided with lateral boundaries being connected in the conveying direction behind the floor plate.

The novel feature of the invention is that the floor plate is arranged in each region in which the reaction mixture above this floor plate is substantially still liquid, and that the inlet for the liquid reaction mixture discharges from underneath, in front of, and/or through the floor plate.

BRIEF DESCRIPTION OF THE DRAWINGS

FIG. 1 is a cross-sectional view of the slabstock foam apparatus according to a first embodiment of the invention.

FIG. 2 is a plane view of five (5) different inlet shapes 2a to 2e which can be used in the slabstock foam apparatus of the invention.

DETAILED DESCRIPTION OF THE INVENTION

Figure 3:
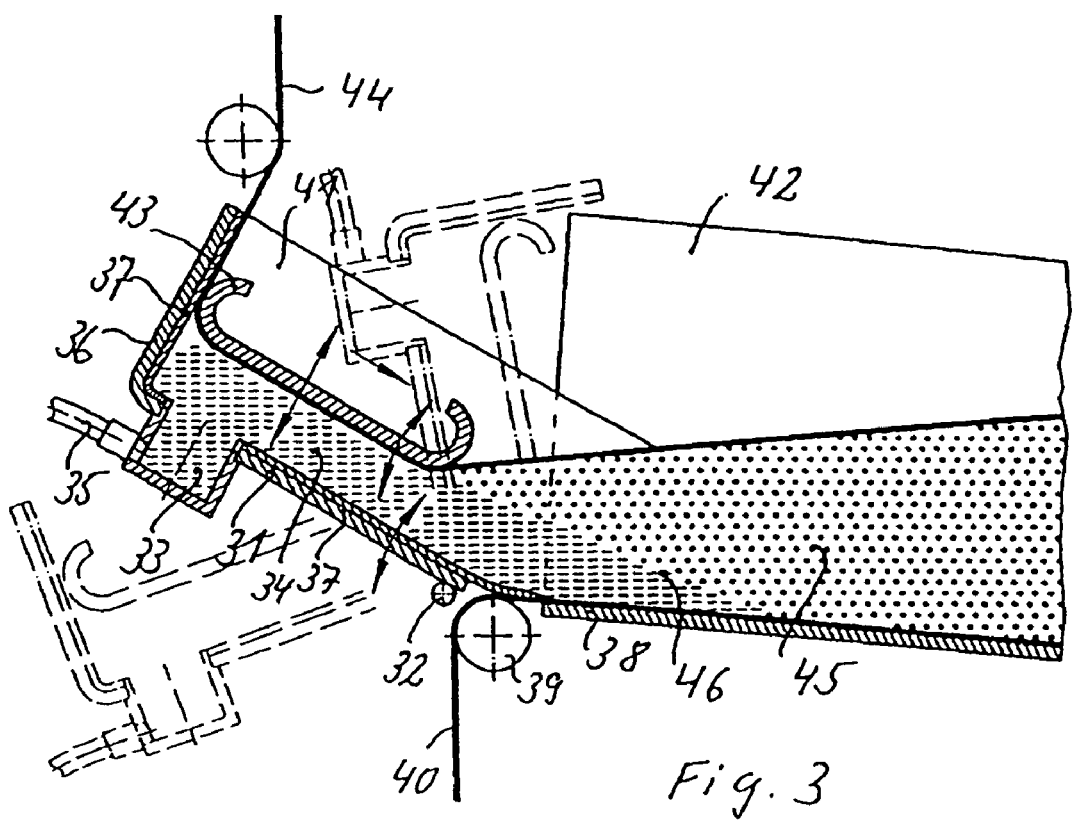
FIG. 3 is a cross-sectional view of the slabstock foam apparatus according to a second embodiment of the invention.

In the present invention, the process for the continuous production of slabstock foam comprises
(1) feeding a liquid reaction mixture, wherein the reaction mixture is fed or discharged from underneath, in front or, or through a floor plate above which the reaction mixture is substantially still in the liquid state,
(2) distributing the liquid reaction mixture transversely, and
(3) allowing the reaction mixture to cream and foam, thereby forming an expanded slabstock foam.

The time available from the discharge of the liquid reaction mixture from the mixing device to the application to the floor plate is, according to the invention, about 1 to 10 seconds, preferably 1 to 5 seconds.

The time can be adjusted without any difficulty by matching the flow rate and/or conveying rate of the reaction mixture, i.e. of the conveyed volume, in relation to the volume the reaction mixture has to flow through before reaching the floor plate.

This is achieved if the liquid reaction mixture passes as a swelling jet from underneath to the floor plate, the inclusion of air and thus the undesired formation of cavities thereby being excluded. During the application (i.e. distribution) of the reaction mixture, it is important that the mixture is as uniform as possible when viewed over the foam width. It has been found that the boundary region between liquid and creamed reaction mixture slants towards the rear relative to the floor plate, with the result that reaction mixture that is always substantially still liquid exists immediately above the floor plate, whereas above this liquid phase the reaction mixture is already creamy. The liquid state of the introduced reaction mixture ensures an automatic good transverse distribution of the reaction mixture, which is optionally supported by auxiliary measures, before the creaming phase begins. It is, of course, possible to branch the liquid reaction mixture stream exiting from the mixer and to introduce (or feed) the reaction mixture in parallel at a plurality of sites. Alternatively, the reaction mixture is fed in a fan-shaped manner to the floor plate. A danger of the slow build-up in the introduction and/or application region for the reaction mixture is avoided in this case, since on the one hand the reaction mixture is still in the liquid phase and on the other hand there are also no static flow spaces. Since the slabstock foam that is formed is continuously removed, the liquid reaction mixture and the already creamy reaction mixture partially present above the slabstock is conveyed forwards by the newly introduced, forwardly pressing reaction mixture and has, therefore, no time to settle. Alternatively, it is also possible to arrange a fall plate section behind this floor plate, before it joins the conveyor belt.

Preferably, the floor plate together with the feed device for the reaction mixture is swivelled about the end of the floor plate lying in the conveying direction of the reaction mixture.

By means of this measure, the progress of the process can be adjusted, especially at the start, and if necessary, can be subsequently fine-tuned. It has proved convenient if the as a rule perpendicular angle formed between the inlet and the floor plate remains unchanged when the angle of inclination of the floor plate is altered.

According to a particular embodiment of the new process, the distance from the feed point of the liquid reaction mixture to the end of the floor plate lying in the conveying direction is adjusted.

This is advantageous in order to ensure that when processing different chemical component formulations, the reaction mixture above the floor plate is substantially still in the liquid state. In this way, the conveying rate can also be taken into account and/or compensated for. In other words, the aforementioned distance can be increased or reduced as necessary, depending on the reaction rate and/or the conveying rate.

Preferably, the introduced reaction mixture is restricted with regard to its height.

In this way, an open but alternatively, optionally closed space is created in the conveying direction, in which the reaction mixture is necessarily under a low pressure, whereby the transverse distribution of the reaction mixture is promoted, with the result that a roughly uniform reaction mixture is present everywhere over the foam width.

The new apparatus for the continuous production of slabstock foam from a liquid reaction mixture comprises a mixer together with an associated floor plate, an inlet for feeding the liquid reaction mixture from the mixer to the floor plate, and a transporting system lined internally with films, and provided with lateral boundaries being connected in the conveying direction behind the floor plate.

The novel feature of the present invention is that the floor plate is arranged in a manner such that the reaction mixture above this floor plate is substantially still liquid, and that the inlet device for the liquid reaction mixture discharges from underneath, in front of, and/or through the floor plate.

Due to this configuration of the apparatus, the liquid reaction mixture from the inlet device swells and is distributed over the floor plate. It is understood that the outflow rate of the liquid reaction mixture from the inlet is maintained so low that turbulences that could cause inclusion of air are avoided. In this embodiment, there are no dead flow regions in which the reaction mixture could continue to react and cause a build-up. In this connection, it is also essential that the reaction mixture is still fluid over the whole inflow region. The inlet is, as a rule, arranged perpendicular from underneath relative to the floor plate, but it can also be arranged at an angle thereto. In its simplest embodiment, the inlet has a round, tubular cross-section. Particularly when working with large foam widths, it should be ensured that the inlet is shaped so that a very rapid transverse distribution of the liquid reaction mixture occurs in order that the reaction mixture is as uniform as possible when viewed over the entire foam width. Accordingly, a branching tube coming from the mixer is, for example, provided so that a plurality of inlets can be arranged in the floor plate. Alternatively, the feed device for the liquid reaction mixture broadens out in a fan-shaped manner underneath the floor plate at least over a part of the foam width and/or of the floor plate, so that the inlet has substantially the cross-sectional shape or mouth shape of a slit die.

Preferably, the floor plate together with the inlet can swivel about a shaft arranged on the end of the floor plate lying in the conveying direction. In this way, the clearance angle of the floor plate can be adjusted.

This swivel angle of the floor plate can be adjusted preferably between −30° and +80°, particularly preferably between 0° and 45°.

By adjusting the inclination of the floor plate in the aforementioned range, the flow rate of the introduced liquid reaction mixture can be influenced particularly easily and effectively.

In accordance with a further embodiment of the present invention, it is particularly advantageous to be able to adjust the distance of the inlet from the end of the floor plate, lying in the conveying direction.

For this reason, the floor plate preferably consists of two partial plates that can be telescopically displaced towards one another.

In this way, the length of this floor plate can easily be increased or decreased corresponding to the relevant requirements. In particular, when processing different chemical formulations, the length of the floor plate can be adjusted in each case according to specific requirements. The telescopic arrangement is accomplished, for example, if one of the two plates, preferably that plate lying further in the conveying direction, is retractably guided in the other plate. This does not present any difficulty since the plates are thin sheet metal plates that are, as a rule, supported. The telescopic arrangement can, however, also be achieved by means of two partial plates that have interengaging, supporting combs.

In order to achieve this objective, alternatively the inlet for the liquid reaction mixture is guided through a longitudinal hole in the floor plate, the longitudinal hole being at least partially covered by a metal sheet rigidly connected to the inlet.

It is understood that the metal sheet is arranged so as to form a seal on the floor plate. The sheet must be sufficiently large and/or shaped so as to prevent any flow of the reaction mixture through the longitudinal hole in all the envisaged positions of the inlet. It is particularly important that the cover sheet be designed sufficiently large so that it can serve as a telescopically adjustable part for adjusting the distance of the inlet from a following base plate or a conveyor belt.

It is particularly important for the base plate (i.e. floor plate) and/or the inlet to be bounded at the rear by a return stop.

In this way, the reaction mixture is prevented from flowing backwards. This arrangement is in particular advantageous if the floor plate is adjusted so as to have a negative angle of inclination. If the floor plate has a longitudinal hole for the displacement of an inlet provided with a metal cover sheet, this cover sheet is preferably arranged edgeways (i.e. sideways) behind the inlet in the conveying direction, and in this manner, forms a return stop. It is understood that the edgeways cover sheet must be sufficiently broad in order to prevent the introduced liquid reaction mixture from being able to flow back laterally around the edgeways arrangement. In the case of a negative angle of inclination of the floor plate, this metal cover sheet must extend over the whole width of the foam surface in order to prevent backflow. A tight connection of this edgeways metal sheet to the lateral boundaries is recommended. The combination of a return stop with an upper covering is also advisable when using negative angles of inclination of the floor plate. In this embodiment, the upper covering preferably lies against the return stop, thereby forming a seal, so as to limit the level of the introduced liquid reaction mixture.

A further particular embodiment is characterised by the fact that a covering is arranged above the floor plate and spaced therefrom.

In this way, the continuously applied liquid reaction mixture can as it were be "enclosed" for a certain time during the conveyance. In this connection, this covering may optionally extend, at least partially, over the already creamy upper mass.

The covering is preferably adjustable.

The covering can most simply be provided by a guide roller with a cover film guided underneath, with any pressure on the resultant foam being exerted, of course, only by the tension of the cover film. An arrangement in the form of a stable skid, underneath which an upper cover film can be guided, is also possible. Alternatively, the covering is in the form of a belt running over rollers. In this case, the upper cover film may advantageously run underneath the belt.

There are various possible ways of adjusting the covering. In this manner, the most suitable form and means of adjusting the covering for the process to be executed can be selected and adjusted depending on the existing construction.

According to a particular embodiment of the apparatus, the perpendicular distance of the covering from the floor plate can be adjusted, and in this way the thickness of the zone located therebetween can also be adjusted.

According to a further possibility the covering can be displaced parallel to the floor plate. In this way, the position from which or up to which the reaction mixture is covered and/or compressed from above can be adjusted.

The covering can also swivel about a shaft, the latter preferably being arranged in the vicinity of the inlet. A swivel shaft on the other end of the covering or for example in the middle of the covering is also possible. In this way the thickness of the reaction mixture flowing past underneath can be adjusted variously over the length of this covering.

A curved covering concavely or convexly relative to the sides (or edges) of the reaction mixture is also possible. Such a curvature can of course also be adjusted, though this is very complicated.

A covering whose length can be altered by means of a telescopic arrangement is also conceivable, similar for example to the two-part telescopic floor plate.

It is understood that these various possibilities, where realisable, may (if desired) also be provided in combination with one another.

Preferably, the floor plate and, optionally, the return stop is covered with a protective layer to prevent adhesion of the liquid reaction mixture to the surface of the floor plate and the return stop.

The protective layer is either rigidly connected to the substrate, or is loosely and replaceably positioned on the substrate.

The above comments apply appropriately, of course, also to any cover sheet that may be present and that is joined to the inlet, and/or to lateral boundaries, and/or an upper covering, without a cover film guided thereunder.

As long as the inlet is still arranged in front of the floor plate, a co-moving floor film may be inserted over the floor plate. Other surfaces coming into direct contact with the reaction mixture, such as the surfaces of the lateral boundaries in the region of the floor plate, can also be protected in this way.

The new apparatus is illustrated diagrammatically in the form of several embodiments in the drawings. Reference will now be made to the figures and to the various embodiments of the apparatus of the present invention.

In FIG. 1, the apparatus constitutes a so-called slabstock foam unit. The apparatus consists of a floor plate 1, which can swivel about an axis 2 lying in the conveying direction in order to adjust the inclination angle of the floor plate 1. An inlet 3 discharging from underneath for a liquid reaction mixture 4 is provided on the entry side in front of the floor plate 1, the inlet 3 together with the floor plate 1 being able to swivel about the axis 2. A feed line 5 leads into the inlet 3 from a mixer (not shown). A return stop 6 prevents the liquid reaction mixture 4 introduced through the inlet 3 from being able to flow backwards. The floor plate 1 as well as the return stop 6 are lined with a protective layer 7 to prevent deposition of the liquid reaction mixture 4. The protective layer 7 consists of a paper coated with silicone and having pressure-sensitive adhesive points on the rear side. So-called fall plates 8 are attached to the floor plate 1, with a guide roller 9 being arranged between the floor plate 1 and these fall plates 8, over which roller 9 a trough-shaped co-running paper film 10 is introduced. The fall plates 8 are joined in the conveying direction to a transporting system (not shown), such as, for example, a conveyor belt. The floor plate 1 is provided with lateral boundaries II that extend at least partially over the fall plates 8, and are likewise lined with a protective layer 7. The fall plates 8, as well as the transporting system or conveyor belt (not shown), are also provided with lateral boundaries 12. The latter are lined by the co-running paper film 10. A guide roller 13 which guides a paper film 14 is arranged over the floor plate. This guide roller 13 is adjustable both as regards longitudinal alignment and height. This paper film 14 covers the liquid reaction mixture 4 and the resultant slabstock foam 15. A transition region 16 in which the reaction mixture transforms into the creamy state and then into the slabstock foam 15 adjoins the liquid region of the reaction mixture shown by the dotted line.

Figure 5:
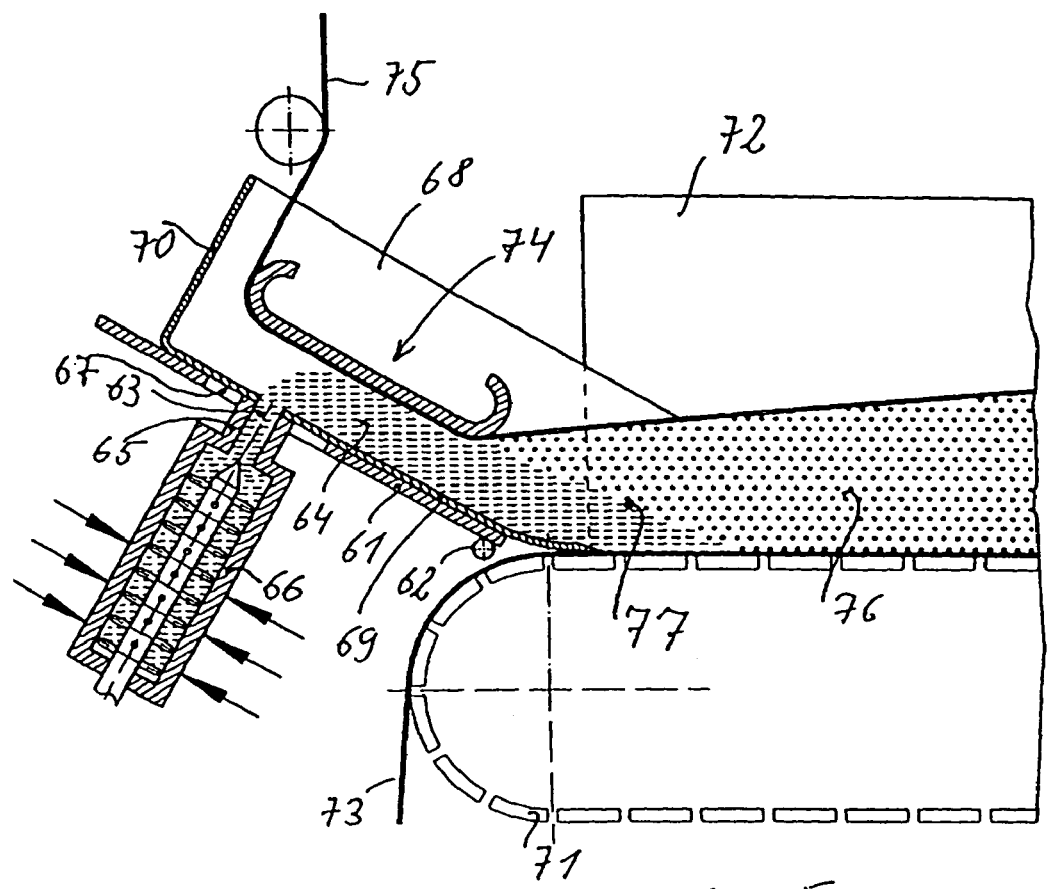
FIG. 5 is a cross-sectional view of the slabstock foam apparatus according to a third embodiment of the invention.

In any embodiment of the present invention as illustrated in FIGS. 1, 3 and 5, the shape of the inlet (numeral 3 in FIG. 1, and numeral 33 in FIG. 3) may vary. This is further illustrated in FIGS. 2a, 2b, 2c, 2d and 2e.

In FIG. 2a, the inlet 21 is of circular shape. In FIG. 2b, the inlet 21 is of rectangular shape. In FIG. 2c, the inlet 21 is in the shape of a "bone". In FIG. 2d, the inlet 21 is in the shape of a gap extending over the foam width. In FIG. 2e, the inlet 21 is in the shape of a gap extending over the foam width, with the shape broadening out towards the sides and by means of which the liquid reaction mixture is guided through a branching arrangement.

According to the present invention, the volume of the feed line 5 and inlet 3 (see FIG. 1) for a conveyed volume of 200 to 600 liters of reaction mixture per minute, which is normal for slabstock foam units, is between 3 and 20 liters.

In FIG. 3, the slabstock foam apparatus consists of a floor plate 31 which can swivel about a shaft (or axis) 32 in order to adjust the angle of inclination of the floor plate 31 to between −30° and +80°. An inlet 33 discharging from underneath for a liquid reaction mixture 34 is provided at the inlet side in front of the floor plate 31, which inlet 33 together with the floor plate 31 can swivel. A feed line 35 leads from a mixer (not shown) to the inlet 33. A return stop 36 prevents the liquid reaction mixture 34 being introduced through the inlet 33 from being able to flow backwards. This is particularly important if the floor plate 31 is adjusted to a negative or only just positive angle. The floor plate 31, as well as the return stop 36, are lined with a protective layer 37 to prevent deposition of the liquid reaction mixture 34. The protective layer 37 consists of a paper coated with silicone and having pressure-sensitive adhesive points on the rear side. So-called fall plates 38 are joined to the floor plate 31, with a guide roller 39 being arranged between the floor plate 31 and the fall plates 38. A trough-shaped paper film 40 is introduced over the guide roller 39. The fall plates 38 join a conveyor belt or other transportation system (not shown) in the conveying direction. The floor plate 31 is provided with lateral boundaries 41 which extend partially over the fall plates 38 and are likewise lined with a protective layer 37. The fall plates 38, as well as the conveyor belt or transportation system (not shown), are likewise provided with lateral boundaries 42. The latter are similarly lined with the paper film 40. An upper covering 43 formed as a skid 43, and beneath which an upper paper film 44 is guided, is arranged over the floor plate 31 and together with the return stop 36 forms a seal. The upper covering 43 can be adjusted as regards longitudinal alignment and height, and can also swivel. The paper film 44 covers the liquid reaction mixture 34 and the resultant slabstock foam 45. A transition region 46 in which the reaction mixture transforms to the creamy state adjoins the liquid region of the liquid reaction mixture 34 shown by the dotted lines.

Figure 4:
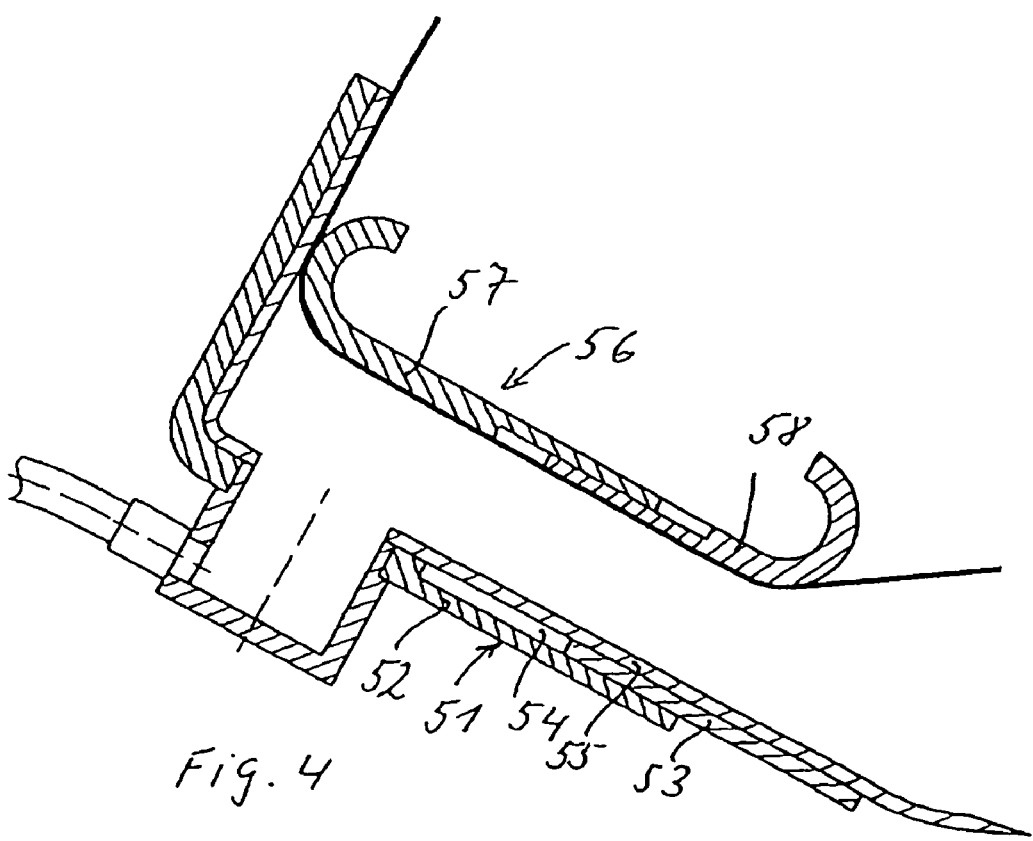
FIG. 4 illustrates the application region of the slabstock foam apparatus of FIG. 3 on an enlarged scale.

The apparatus illustrated in FIG. 4 corresponds in principle to the apparatus shown in FIG. 3. FIG. 4 is an enlarged detail of the application region of the apparatus in FIG. 3. In FIG. 4, the floor plate 51 consists (in this case) of a fixed part 52 and of a telescopically retractable part 53, wherein these two parts 52 and 53 have sufficiently narrow webs 54 that interengage in a comb-like manner so that a protective layer 55 arranged thereover is adequately supported. In this manner, the overall length of the floor plate 51 can be adjusted. A length-adjustable and height-adjustable, as well as swivellable upper covering 56 is likewise telescopically retractable, since it consists of two parts 57 and 58 that can be displaced towards one another.

In FIG. 5, the apparatus consists of a floor plate 61 that can swivel about a shaft 62 in order to adjust the angle of inclination of the floor plate 61 to between −30° and +80°. An inlet 63 for a liquid reaction mixture 64 discharges from underneath through this floor plate 61, the inlet 63 being joined via a connection piece 65 to a mixer 66. This connection piece 65 is guided through a longitudinal hole 67 in the floor plate 61. The inlet 63 is provided with a metal cover sheet 69 that extends over the whole foam width, and thus reaches as far as the lateral boundaries 68. The cover sheet forming as it were a telescopically retractable part 69 of the floor plate 61. This cover sheet has an edgeways (sideways) aligned return stop 70 that is tightly joined at the sides to the lateral boundaries 68. A protective layer preventing adhesion on the lateral boundaries 68, the cover sheet 69 and the return stop 70, is not shown for the sake of clarity. The floor plate 61 together with all the associated parts 65, 66, 67, 68, 69 and 70 is swivellably arranged. A conveyor belt 71, over which a trough-shaped paper film 73 runs to provide a lining, also has lateral boundaries 72 adjoining the metal cover sheet 69. These lateral boundaries 72 may also be lined with the trough-shaped paper film 73. An upper covering 74 formed as a skid, underneath which is guided an upper paper film 75, is arranged above the floor plate 61 and spaced apart therefrom. This covering 74 can be adjusted both as regards longitudinal alignment and height, and can also swivel. The upper paper film 75 covers the liquid reaction mixture 64 and the resultant slabstock foam 76. A transition region 77 in which the reaction mixture transforms to the creamy state and then to the slabstock foam 76 adjoins the liquid region of the reaction mixture 64 shown by the dotted lines.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed:

1. An apparatus for the continuous production of slabstock foam from a liquid reaction mixture, comprising:
   (a) a floor plate,
   (b) a mixer for preparing a foam forming liquid reaction mixture,
   (c) an inlet for feeding the liquid reaction mixture from said mixer to said floor plate, wherein the volume of said inlet is between 3 and 20 liters, for a conveyed volume of 200 to 600 liters of reaction mixture per minute,
   (d) a transporting system for moving a liner in the conveying direction, said transporting system being located downstream from said floor plate,
   (e) lateral boundaries attached to said transporting system in the conveying direction,
   wherein said inlet for feeding the liquid reaction mixture discharges the liquid reaction mixture from underneath, in front of, or through said floor plate, with said inlet and said floor plate being arranged such that the reaction mixture above the floor plate is still substantially liquid.

2. The apparatus of claim 1, additionally comprising
   (f) a shaft attached on the end of said floor plate which located closest to said transporting system, wherein said floor plate and said inlet can swivel about said shaft.

3. The apparatus of claim 2, wherein the angle of swivel of said floor plate is adjustable between −30° and +80°.

4. The apparatus of claim 3, wherein the angle of swivel of said floor plate is adjustable between 0° and +45°.

5. The apparatus of claim 1, wherein the distance between said inlet for feeding the liquid reaction mixture and the end of the floor plate lying in the conveying direction is adjustable.

6. The apparatus of claim 5, wherein said floor plate comprises two partial plates that can be telescopically displaced towards one another.

7. The apparatus of claim 5, wherein said inlet for feeding the liquid reaction mixture is guided through a longitudinal opening in said floor plate, and a metal cover sheet is rigidly connected to the inlet and covers the longitudinal opening in said floor plate.

8. The apparatus of claim 1, additionally comprising
   (g) a covering arranged at a distance above said floor plate, wherein the width of said covering corresponds to the width of said floor plate, and said covering may be independently mounted, or indirectly or directly attached to said floor plate.

9. The apparatus of claim 8, wherein the distance between said covering and said floor plate is adjustable.

10. The apparatus of claim 1, additionally comprising
    (h) a means for stopping and/or returning the liquid reaction mixture being fed through said inlet onto said floor plate from flowing in the opposite direction of the conveying direction.

11. The apparatus of claim 1, wherein said floor plate is lined with a protective layer to prevent adhesion of the liquid reaction mixture to the surface of said floor plate.

\* \* \* \* \*